Patented Apr. 8, 1952

2,592,350

UNITED STATES PATENT OFFICE 2,592,350

PREPARATION OF POLYMERIC ORGANIC CATION RESIN EXCHANGERS CONTAINING IMINO GROUPS

Anders Skogseid, Heroya, Norway, assignor to Norsk Hydro-Elektrisk Kvaelstofaktieselskab, Oslo, Norway, a firm of Norway No Drawing. Application March 20, 1951, Serial No. 216,662. In Norway September 2, 1943

5 Claims. (Cl. 260—89.7)

The present application is a continuation-in-part of application Serial No. 754,064, filed June 11, 1947, now abandoned.

The present invention has as its object the preparation of new synthetic high molecular weight compounds particularly useful as cation exchange resins and containing imino groups to which the cation exchange property is directed. The imino group, or secondary amino group has heretofore not been successfully introduced into a high molecular weight polymer exchanger to function as a cation exchanger, because the basic nature of the secondary amine group has been considered to preclude its use for cation exchange, and to permit its use only as an anion exchange material.

A further object of the invention is the preparation of a synthetic resin cation exchange briquetted material of controlled porosity and particle size dimensions, which provides a highly efficient and uniform adsorption and absorption behavior in its cation exchange function.

A further object of the invention is the preparation of high molecular weight synthetic resin compositions, containing the imino or secondary amine cation exchange group, which imino group has been activated, so that the hydrogen atom attached to the nitrogen of the imino group is highly mobile in the resin molecule and is readily replaceable in aqueous solutions by another cation. The activation of the imino group in the new resinous products of the invention is accomplished by the introduction of highly negative polarizing groups such as nitro groups, nitro and halogen groups etc. into the benzene ring structure to which the imino group is attached. The highly negative groups are introduced into those free positions of the benzene ring which are ortho and para to the so-activated imino group, to obtain the maximum activation which is essential to the cation exchange function of the imino or secondary amine group of the resin exchange molecule.

It is known to produce synthetic compositions comprising groups such as: —OH, —COOH, —CH$_2$.SO$_3$H and to use the same as cation exchangers (R. Griessbach, Angew. 52 (1939), 215). It is also known to produce synthetic compositions comprising amino- and imino-groups, but these, owing to the basic nature of the groups, can only be used as anion exchangers.

It has been found, as herein pointed out, that secondary amino groups or imino groups may be made acid even in high molecular weight synthetic resins by the introduction of negative or polarizing groups into the resin molecules in a manner similar to that employed with the monomer compounds, and that the high molecular weight resins thus obtained may be effectively used as cation exchangers. Hereby a new group, the imino group, has been added by the invention herein, to the groups above mentioned, to function as a carrier of the cation exchange property.

The inventive cation exchange high molecular weight resins of the invention are highly nitrated secondary cyclic amine compounds, formulated as indicated herein below.

In the production of the novel cation exchange synthetic resins of the invention, the starting materials employed are high molecular weight resinous cyclic primary amines, i. e. polyamino styrenes, polyvinyl naphthyl amines and high molecular weight condensation products containing aromatic amines. The high molecular weight resin containing primary amino groups is condensed with nitrated halogen benzenes, and with nitrated halogen naphthalenes etc., e. g. with picryl-chloride, 1 chlor 2,4,5 trinitronaphthalene, or with 2,4,6, trichloro 1,3,5 trinitrobenzene. If condensed with a compound such as picrylchloride there is obtained only one imino group in the elementary molecule of the exchanger. If, however, condensed with a dichlor- or trichlor compound, such as 2,4,6-trichlor-1,3,5-trinitrobenzene, the condensation product may again be condensed with benzene amines or naphthylamines, and there is obtained two or three imino groups in the elementary molecule of the exchanger. Hereby the capacity of the exchanger is also correspondingly increased.

The hydrogen in the imino groups, obtained by the above mentioned condensations, is however not sufficiently mobile for using the compositions as cation exchangers before there has been introduced additional negative groups into the molecule, such as nitro groups, particularly in the ortho positions to the imino group. By nitration of the condensation products with nitric acid the nitro groups will then also enter the benzene ring in the ortho and para positions to the imino groups to the extent to which these positions are free.

With poly-amino-styrene as base material and condensation with picryl-chloride and subsequent nitration there is produced poly-4'-vinyl-(2,4,6,2',6'-pentanitro-diphenylamine) of the following formula:

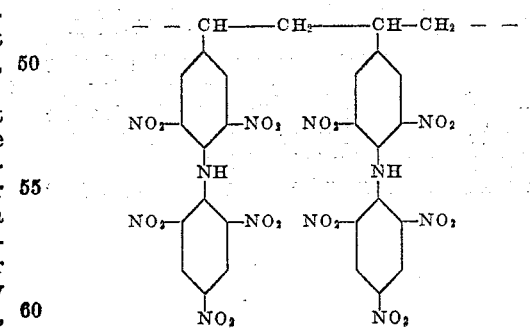

In the above formula, the picryl chloride polyamino styrene condensation product has been completely nitrated to introduce two additional nitro groups into the benzene ring moiety of the polyamino styrene portion of the molecule.

The imino groups of the condensation product of polyamino styrene and picryl chloride is protected against oxidation during nitration by the electron attracting power of the picryl radical. The first nitro group enters the condensation product under evolution of great heat, and the reaction mixture should be cooled. For this step a weaker nitrating agent may be used. The second nitro group enters the ring with evolution of much less heat, and the nitrating agent has to be stronger in order to complete the reaction. Both the first and the second nitro group increase the stability of the product against strong chemical agents. Thus this ion-exchanger product is completely stable even in concentrated nitric and sulfuric acids.

When combining the two nitration steps, which often may be preferable, there has to be used a fairly strong nitrating agent such as fuming or red fuming nitric acid, in order to complete the second step. In such a case it is advantageous to use a great excess of nitrating agent as this helps in absorbing and transporting the heat evolved. Fuming nitric acid is also a good solvent for the small amounts of destruction products accompanying the nitration process.

The nitration process may be carried out also in mixtures of nitric and sulfuric acids, and in some cases even in nitric and acetic acid mixtures, when heating is applied to aid the entrance of the last nitro group into the molecule being nitrated.

In carrying out the complete nitration under efficient temperature control, low temperatures of $-10°$ C. or less may be used or temperatures as high as approximately $25°$ C. also give equally good results.

The amount of excess nitric acid used, as is usual in low temperature nitrations, is determined by the operator who is desirous of maintaining efficient stirring, good cooling efficiencies in the liquid nitrating bath, and in preventing the product from balling up. Where such proper manipulative precautions are observed, in accordance with the specific example given herein below, the completely nitrated resin is readily obtained, using a wide range of nitrating acid quantities varying from stoichiometric quantities (substantially two moles of $HNO_3$) up to volume ratios of greater than 1000 cc. of fuming of $HNO_3$ to 100 g. of condensation product, without causing undesirable oxidation of the nitration product nor of preventing attaining a completely nitrated product.

In order to obtain an exchanger with suitable granular dimensions and mechanical properties one may either start with a macromolecular cyclic amine with the correct granular dimension and porosity and maintain these properties during the production processes, or one may work with finely divided material and then finally give the exchanger correct granular dimensions and mechanical properties by briquetting.

An example will now be given for the purpose of illustrating and not of restricting the invention.

Example 100 g. poly-amino-styrene with anion capacity 6.2 meq./g. was boiled at atmospheric pressure for 4 hours with 200 g. picryl chloride dissolved in 2000 cc. alcohol. The output of the condensation product was 240 g. This product was nitrated with fuming nitric acid, 98% by weight of $HNO_3$, in the following manner: 700 cc. of the acid was cooled to $-10°$ C., and 200 g. of the above mentioned condensation product was gradually poured into the acid under intense stirring and cooling. After having added all of the condensation product, the reaction mixture was set aside for 15 hours at $8°$ C. The condensation product before nitration was red-brown, the nitrated product was yellow. The powdered nitration product was separated, washed acid free and was briquetted in the presence of water.

The cation exchange capacity of the product was 2.2 meq./g.—milliequivalents of cation per gram of resin exchanger. This preparation hence provides a 92.5% cation active substance starting with a polyamino styrene of anion capacity 6.2 meq./g. and obtaining a nitrated imino resin of 2.2 meq./g. capacity; a yield of substantially 100% of the theoretical.

Having thus described the invention, what is claimed is:

1. A process for the preparation of synthetic resin cation exchangers comprising the steps of condensing polyamino styrene with a nitrated halogen benzene and thereafter nitrating the benzenoid ring structure of the condensation product with an excess of nitric acid.

2. A process for the preparation of synthetic resin cation exchangers comprising the steps of condensing polyamino styrene with a nitrated halogen benzene and thereafter nitrating the benzenoid ring structure of the condensation product with an excess of fuming nitric acid at $-10$ to $+25°$ C.

3. A process as in claim 1 in which the completely nitrated imino resin cation exchange product is further briquetted in water.

4. A process for the preparation of synthetic resin cation exchangers comprising the steps of condensing polyamino styrene with nitrated halogen benzene and thereafter nitrating the benzenoid ring structure of the condensation product with an excess of fuming nitric acid at $-10$ to $+25°$ C. and briquetting the product in water.

5. A process for the preparation of synthetic resin cation exchangers comprising the steps of condensing polyamino styrene with picryl chloride and thereafter nitrating the benzenoid ring structure of the condensation product with an excess of fuming nitric acid at $-10$ to $+25°$ C.

ANDERS SKOGSEID.

REFERENCES CITED

The following references are of record in the file of this patent:

FOREIGN PATENTS

| Number | Country | Date |
|---|---|---|
| 116,463 | Sweden | May 28, 1946 |